No. 761,267. PATENTED MAY 31, 1904.
W. F. TAYLOR.
MAGNETO.
APPLICATION FILED FEB. 19, 1904.
NO MODEL.
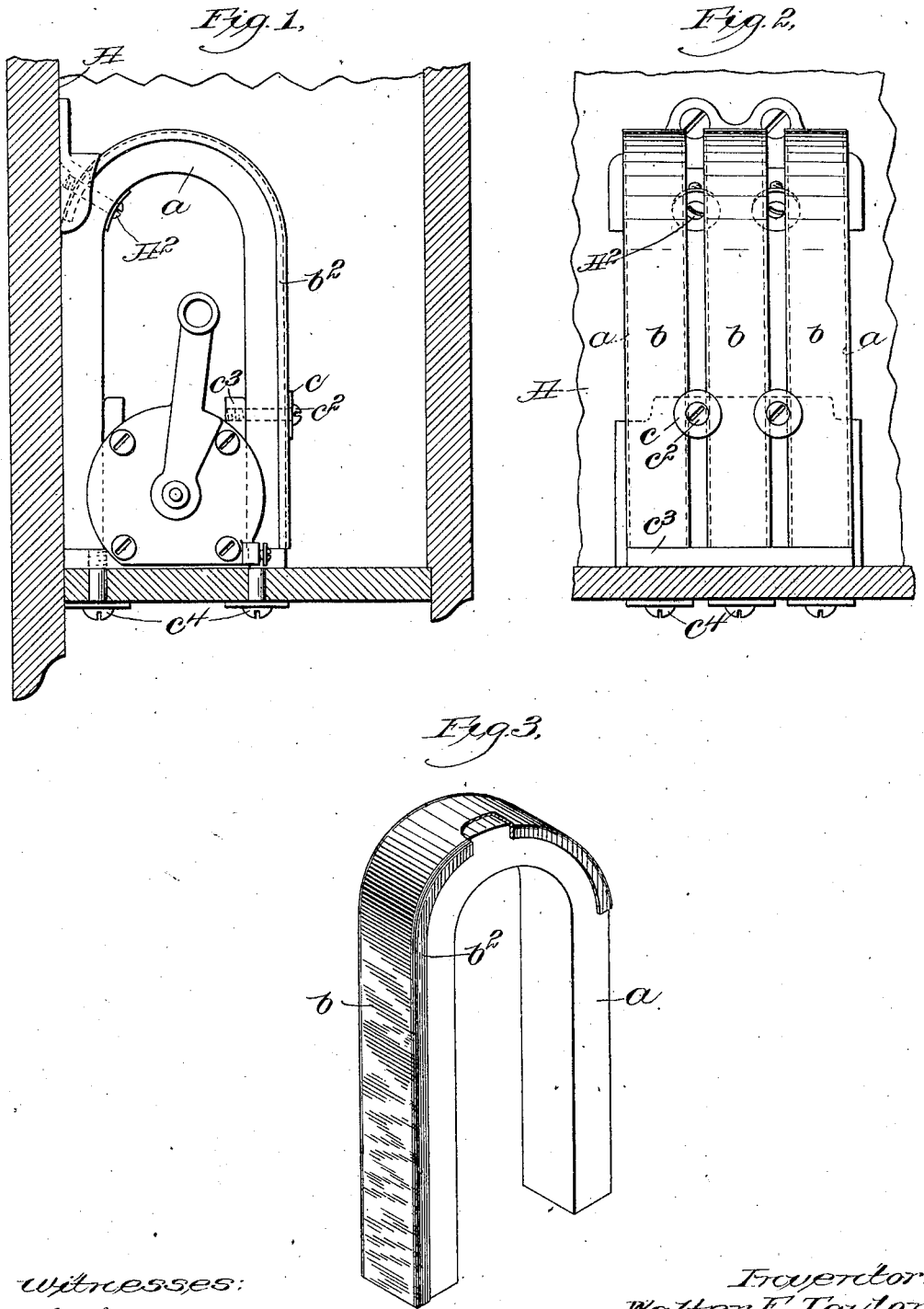

No. 761,267. Patented May 31, 1904.

UNITED STATES PATENT OFFICE.

WALTER F. TAYLOR, OF BROOKLINE, MASSACHUSETTS, ASSIGNOR TO HOLTZER CABOT ELECTRIC COMPANY, A CORPORATION OF MASSACHUSETTS.

MAGNETO.

SPECIFICATION forming part of Letters Patent No. 761,267, dated May 31, 1904.

Application filed February 19, 1904. Serial No. 194,366. (No model.)

*To all whom it may concern:*

Be it known that I, WALTER F. TAYLOR, a citizen of the United States, residing in Brookline, county of Norfolk, and State of Massachusetts, have invented an Improvement in Magnetos, of which the following description, in connection with the accompanying drawings, is a specification, like letters on the drawings representing like parts.

The present invention relates to a magneto, the object of the invention being to provide the permanent magnets thereof with a protecting substance which will keep them from rusting, &c., and at the same time to give the magnets a finished appearance after they are assembled in the magneto.

In the manufacture of the permanent magnets for a magneto the material is usually flawed or cracked to a certain extent, so that if the magnets are polished and plated the plating is liable to crack where there are imperfections in the material, so that the material is likely to rust and cause the plating to peel off. The material, however, can be thoroughly protected by a more penetrating substance, such as aluminium-paint; but this material is not capable of being burnished, so as to give a finished appearance. In accordance with the invention the magnets are first coated with some such protecting substance and are then provided with a thin shield of sheet metal flanged so as to fit over the outer surface of the magnet, this shell being plated and burnished, the material used being usually copper, which is capable of being nickel-plated and of holding the nickel permanently.

Figure 1 is a side elevation of a magneto embodying the invention. Fig. 2 is a front elevation, and Fig. 3 is a perspective view, of one of the magnets with part of the sheet-metal shield broken away.

The magnets $a$ in accordance with the invention are provided with a coating of protecting substance which is capable of covering and penetrating all the irregular or imperfect portions of the magnets, and each magnet is then provided with a shield $b$, of thin sheet metal, provided with flanges $b^2$, which fit over the sides of the magnets in order to keep the shields in place. As herein shown, the shields $b$ are shaped so as to fit over the top and front of the magnets $a$, since it is not essential to extend the shields down the backs of the magnets, where they lie in contact with the back of the magneto-box A. The back parts of the shields, however, extend downwardly over the backs of the magnets far enough to be clamped and held in position between the backs of the magnets and the wall of the box, so that the said shields are held in position by means of the fastener-screws $A^2$, which secure the magnets to the back of the box near the top. At the front the shields $b$ extend all the way down and are held in place by the washers $c$, which overlap adjacent magnets and are held in position by means of screws $c^2$, which extend inward between the magnets and are fastened to the lower frame-piece $c^3$, which is secured by the screws $c^4$ to the bottom of the box. These shields may be made of sheet-copper, nickel-plated and burnished, so that they give a finished appearance to the magneto and at the same time aid in the protection of the magnets from deterioration by rust, &c.

By the construction described the magnets can be thoroughly protected and the proper finish obtained at very much less expense than is the case where the magnets themselves are plated and burnished.

What I claim is—

In a magneto, a permanent magnet provided with a coating of protecting material, and a burnished shield of sheet metal fitted over the outer surface thereof, as set forth.

In testimony whereof I have signed my name to this specification in the presence of two subscribing witnesses.

WALTER F. TAYLOR.

Witnesses:
HENRY J. LIVERMORE,
MARGARET E. COVENEY.